United States Patent
Rytilae et al.

(10) Patent No.: US 11,431,372 B2
(45) Date of Patent: Aug. 30, 2022

(54) ENHANCED ELEVATOR RADIO SIGNAL COVERAGE

(71) Applicant: Kone Corporation, Helsinki (FI)

(72) Inventors: Hannu Rytilae, Helsinki (FI); Tommi Huotari, Helsinki (FI)

(73) Assignee: Kone Corporation, Helsinki (FI)

( * ) Notice: Subject to any disclaimer, the term of this patent is extended or adjusted under 35 U.S.C. 154(b) by 171 days.

(21) Appl. No.: 16/217,674

(22) Filed: Dec. 12, 2018

(65) Prior Publication Data
US 2019/0115943 A1 Apr. 18, 2019

Related U.S. Application Data

(63) Continuation of application No. PCT/FI2016/050426, filed on Jun. 14, 2016.

(51) Int. Cl.
*H04B 1/38* (2015.01)
*H04B 7/14* (2006.01)
(Continued)

(52) U.S. Cl.
CPC ............. *H04B 1/38* (2013.01); *B66B 1/3446* (2013.01); *B66B 1/3461* (2013.01); *H01Q 1/27* (2013.01);
(Continued)

(58) Field of Classification Search
CPC ... B66B 1/3461; B66B 1/3492; B66B 5/0031; B66B 1/28; B66B 1/468; B66B 5/0025;
(Continued)

(56) References Cited

U.S. PATENT DOCUMENTS 6,032,020 A * 2/2000 Cook .................... H04B 7/2606
455/523
6,684,055 B1 * 1/2004 Blackaby .............. B66B 5/0037
340/12.3
(Continued)

FOREIGN PATENT DOCUMENTS

CN 202663399 U 1/2013
CN 102223162 B 11/2013
(Continued)

OTHER PUBLICATIONS

"GSM elevator repeater", CLEARCAST, Mar. 23, 2015 (Mar. 23, 2015), XP055465799, Retrieved from the Internet <URL:https://web.archive.org/web/20150323071020/http://clearcast.biz/products_detai!.php?index_id=26> [retrieved on Oct. 6, 2016].
(Continued)

*Primary Examiner* — Ajibola A Akinyemi
(74) *Attorney, Agent, or Firm* — Harness, Dickey & Pierce, P.L.C.

(57) ABSTRACT

The invention allows enhancing radio signal coverage in an elevator environment. An elevator antenna pair comprises a primary antenna that is configured to transmit and receive radio frequency signals with an external wireless communication network. The elevator antenna pair further comprises a secondary antenna that is communicatively connected to the primary antenna and configured to transmit and receive radio frequency signals with at least one radio frequency transceiver in an elevator car. The primary antenna is arranged within an elevator landing signalization unit, and the secondary antenna is arranged inside an elevator hoistway.

11 Claims, 2 Drawing Sheets

(51) Int. Cl.
*H04W 16/26* (2009.01)
*B66B 1/34* (2006.01)
*H04B 7/155* (2006.01)
*H01Q 1/27* (2006.01)
*H01Q 1/38* (2006.01)

(52) U.S. Cl.
CPC ........... *H04B 7/14* (2013.01); *H04B 7/15507* (2013.01); *H04W 16/26* (2013.01); *H01Q 1/38* (2013.01)

(58) Field of Classification Search
CPC ....... B66B 5/0087; B66B 5/02; B66B 5/0018; B66B 9/00; B66B 2201/4653; B66B 13/12; B66B 2201/4615; B66B 13/20; B66B 11/0246; B66B 13/143; B66B 13/22; B66B 19/00; B66B 1/3476; B66B 5/027
USPC ........................................................ 455/90.1
See application file for complete search history.

(56) References Cited

U.S. PATENT DOCUMENTS

2001/0035828 A1* 11/2001 Rossignol ............... B66B 13/24 187/390
2005/0194217 A1* 9/2005 Smith ................... B66B 1/3415 187/247
2014/0224591 A1* 8/2014 Garcia .................. B66B 1/3415 187/251
2015/0148855 A1* 5/2015 Szakelyhidi ......... H01Q 1/2208 343/702
2015/0183618 A1* 7/2015 Kondo .................... B66B 1/468 187/247

FOREIGN PATENT DOCUMENTS

| | | |
|---|---|---|
| EP | 1959702 A1 | 8/2008 |
| JP | 2002271228 A | 9/2002 |
| KR | 20080104778 A | 12/2008 |
| KR | 20120099555 A | 9/2012 |
| KR | 2014-0132920 A | 11/2014 |
| WO | WO-9413067 A1 | 6/1994 |

OTHER PUBLICATIONS

International Search Report PCT/ISA/210 for International Application No. PCT/FI2016/050426 dated Oct. 12, 2016.
Written Opinion of the International Searching Authority PCT/ISA/237 for International Application No. PCT/FI2016/050426 dated Oct. 12, 2016.
Chinese Office Action dated Jul. 22, 2020 by the Patent Office of China for corresponding application No. CN 201680086827.6.
Office Action dated Jun. 2, 2021 by the China National Intellectual Property Administration for corresponding Application No. 201680086827.6.

* cited by examiner

ENHANCED ELEVATOR RADIO SIGNAL COVERAGE

This application is a continuation of PCT International Application No. PCT/FI2016/050426 which has an International filing date of Jun. 14, 2016, the entire contents of which are incorporated herein by reference.

BACKGROUND OF THE INVENTION

Field of the Invention

The invention relates to passenger transportation systems of a building and radio communication. In particular, the invention relates to enhanced radio signal coverage in an elevator environment.

Description of the Related Art

Passenger transportation devices and systems such as lifts/elevators of a building typically include e.g. an emergency telephone or other telephony equipment that nowadays often utilizes wireless technology such as second generation (2G) or third generation (3G) mobile telecommunications technology. Furthermore, passengers in the elevator cars may need to be able to use their handheld wireless devices.

However, since the hoistway is usually a backbone of the building made e.g. from concrete and steel, it is difficult for a wireless network signal to get into the hoistway where the wireless transceiver is often located. Furthermore, e.g. metal coated thermal insulations and selective windows prevent network signal access to a building.

On the other hand, getting an antenna of the wireless transceiver out from the hoistway is often difficult. Furthermore, using active repeaters and the like to improve the signal in the hoistway requires costly components and extra electric power. Furthermore, in some countries and/or areas only network operators are allowed to install active repeaters.

Accordingly, an object of the present invention is to alleviate the problems described above and to introduce a solution that allows enhancing radio signal coverage in an elevator environment.

SUMMARY OF THE INVENTION

An embodiment of an elevator antenna pair comprises a primary antenna that is configured to transmit and receive radio frequency signals with an external wireless communication network. The elevator antenna pair further comprises a secondary antenna that is communicatively connected to the primary antenna and configured to transmit and receive radio frequency signals with at least one radio frequency transceiver in an elevator car. The primary antenna is arranged within an elevator landing signalization unit, and the secondary antenna is arranged inside an elevator hoistway.

In an embodiment, alternatively or in addition to the above described embodiments, the primary antenna comprises a passive repeater antenna.

In an embodiment, alternatively or in addition to the above described embodiments, the secondary antenna comprises a passive repeater antenna.

In an embodiment, alternatively or in addition to the above described embodiments, the secondary antenna is communicatively connected to the primary antenna via a wire, and further via a connector arranged in the elevator landing signalization unit.

In an embodiment, alternatively or in addition to the above described embodiments, the connector is further arranged on a printed circuit board of the elevator landing signalization unit.

In an embodiment, alternatively or in addition to the above described embodiments, the primary antenna is arranged on or in a printed circuit board of the elevator landing signalization unit.

In an embodiment, alternatively or in addition to the above described embodiments, the primary antenna comprises a metal foil.

In an embodiment, alternatively or in addition to the above described embodiments, the external wireless communication network comprises a wireless telecommunication network.

In an embodiment, alternatively or in addition to the above described embodiments, at least one radio frequency transceiver in the elevator car comprises an elevator emergency telephone.

An embodiment of an elevator system comprises an elevator car having at least one radio frequency transceiver. The elevator system further comprises a hoistway that comprises openings to floors, each opening having an associated elevator landing signalization unit. The elevator system further comprises at least one elevator antenna pair of the above embodiment(s).

In an embodiment, alternatively or in addition to the above described embodiments, at least one of the elevator landing signalization units comprises at least one of elevator call buttons, elevator hall lanterns or elevator hall indicators.

In an embodiment, alternatively or in addition to the above described embodiments, the wire of each antenna pair is laid via a hoistway wall through-hole arranged for display cabling of an associated elevator landing signalization unit.

In an embodiment, alternatively or in addition to the above described embodiments, the elevator system comprises at least two elevator antenna pairs according to the above embodiment(s), the primary antennas of which are each arranged in elevator landing signalization units at different floors.

In an embodiment, alternatively or in addition to the above described embodiments, one of the elevator antenna pairs is arranged in a top floor.

In an embodiment, alternatively or in addition to the above described embodiments, one of the elevator antenna pairs is arranged in a bottom floor.

In an embodiment, alternatively or in addition to the above described embodiments, the elevator antenna pairs are distributed substantially evenly between the floors to provide radio signal coverage for the whole hoistway length.

The invention allows enhancing radio signal coverage in an elevator environment. At least some of the embodiments allow easy installation since no extra wall drillings for antennas are needed. At least some of the embodiments allow low cost installation since no expensive active repeater antennas or amplifiers are needed. At least some of the embodiments allow low cost installation since no high quality (and expensive) cabling to connect active repeater antennas to each other is needed. At the same time, at least some of the embodiments allow providing radio signal coverage for the whole travel of an elevator car. At least some of the embodiments allow integrating the antenna structure into already existing electronics at least partially, such as call button and/or call display devices at landings. At least some of the embodiments allow enhancing elevator radio signal coverage in a way that requires little maintenance and no on-site electric power due to the use of passive repeater antennas. At least some of the embodiments allow enhancing elevator radio signal coverage for both wireless elevator emergency telephones and wireless devices of the passengers in the elevator car.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

Like reference numerals are used to designate like parts in the accompanying drawings.

DETAILED DESCRIPTION OF THE INVENTION

Reference will now be made in detail to embodiments of the present invention, examples of which are illustrated in the accompanying drawings. The detailed description provided below in connection with the appended drawings is intended as a description of the present examples and is not intended to represent the only forms in which the present examples may be constructed or utilized. The description sets forth the functions of the examples and the sequence of operations for constructing and operating the example. However, the same or equivalent functions and sequences may be accomplished by different examples.

Figure 1:
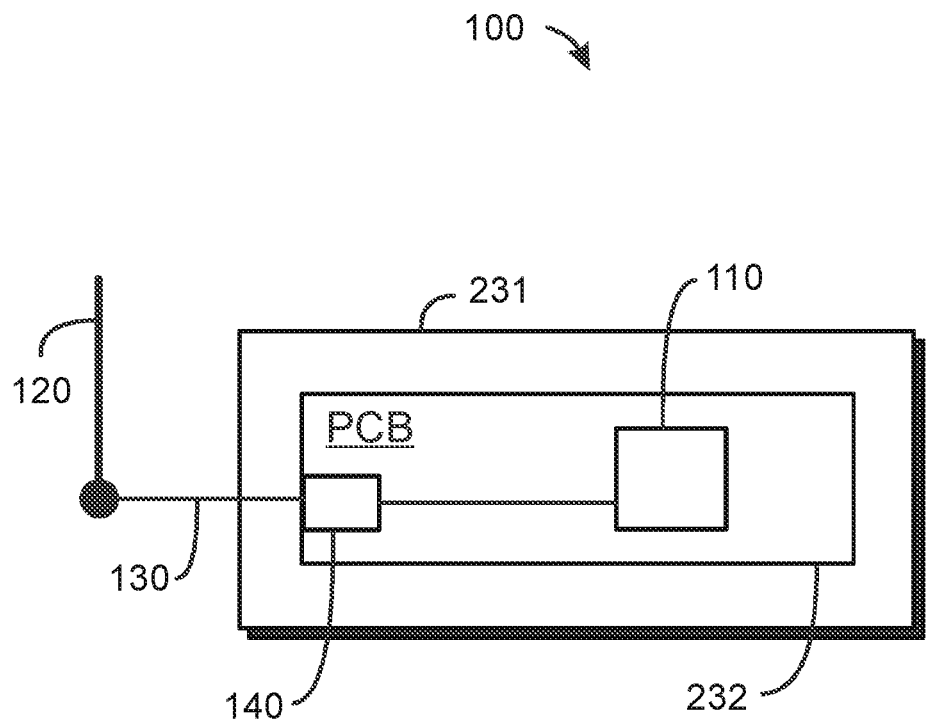
FIG. 1 is an example block diagram of elevator antenna pair in accordance with an example embodiment.

FIG. 1 illustrates an elevator antenna pair 100. It should be noted that at least some of the elements described below may not be mandatory and thus some may be omitted in certain embodiments.

The elevator antenna pair 100 comprises a primary antenna 110 that is configured to transmit and receive radio frequency signals with an external wireless communication network. The external wireless communication network may comprise e.g. a wireless telecommunication network, such as a mobile telecommunications network based on second generation (2G), third generation (3G), fourth generation (4G) and/or fifth generation (5G) mobile telecommunications technology. Alternatively/in addition, the wireless communication network may comprise e.g. a wireless local area network (WLAN).

Figure 2:
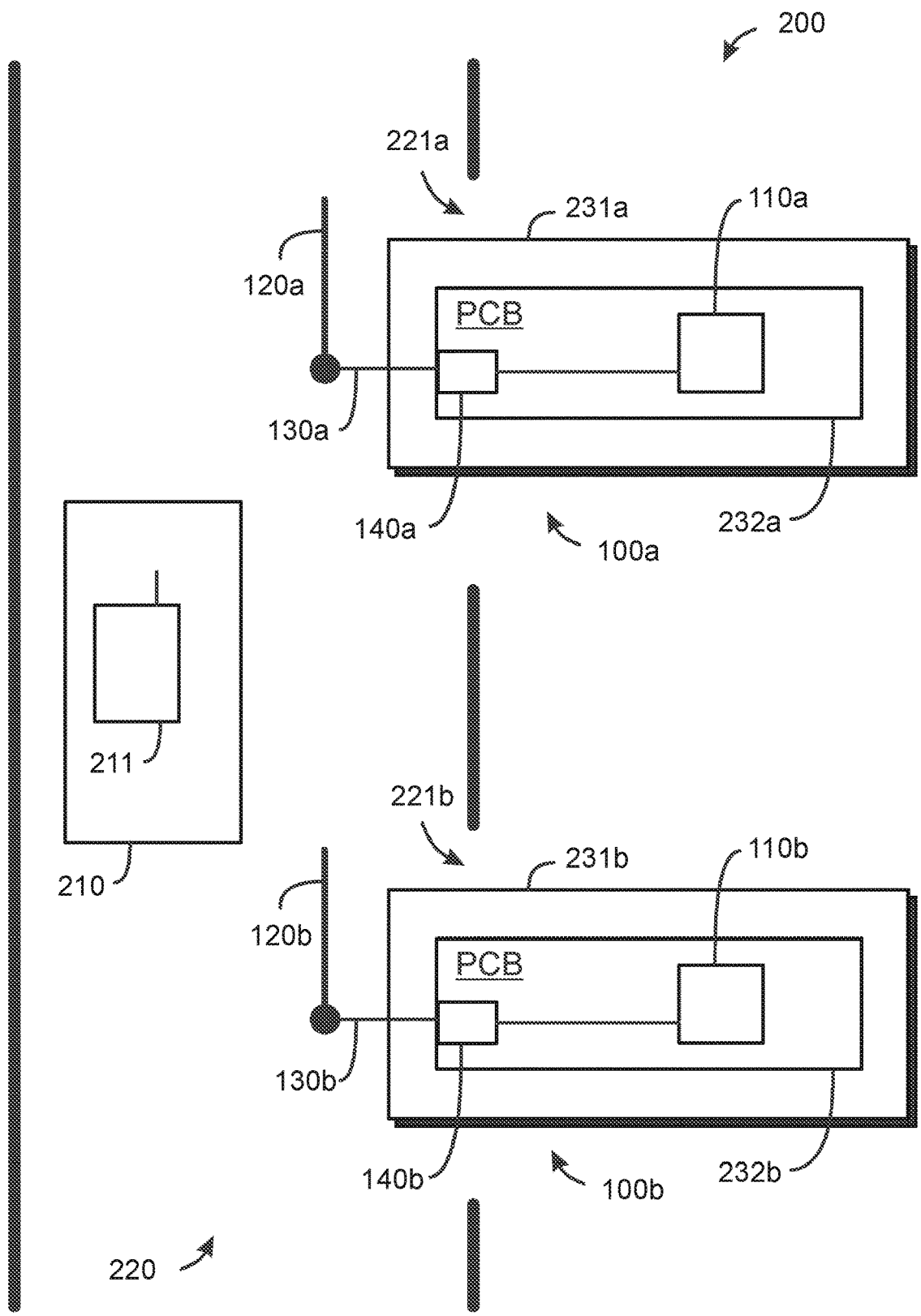
FIG. 2 is an example block diagram of an elevator system incorporating elevator antenna pairs in accordance with an example embodiment.

The elevator antenna pair 100 further comprises a secondary antenna 120 that is communicatively connected to the primary antenna 110 and configured to transmit and receive radio frequency signals with at least one radio frequency transceiver in an elevator car, such as the radio frequency transceiver 211 in the elevator car 210 of FIG. 2.

The primary antenna 110 and the secondary antenna 120 may each comprise a passive repeater antenna. The primary antenna 110 is arranged within an elevator landing signalization unit, such as the elevator landing signalization unit 231a or 231b of FIG. 2. The secondary antenna 120 is arranged inside an elevator hoistway, such as the elevator hoistway 220 of FIG. 2.

The secondary antenna 120 may be communicatively connected to the primary antenna 110 via a wire 130, and further via a connector 140 that may be arranged (e.g. pre-installed) in the elevator landing signalization unit 231.

The elevator landing signalization unit 231 may comprise a printed circuit board (PCB) 232 on which the connector 140 may be arranged or installed. Furthermore, the primary antenna 110 may be arranged on or in the printed circuit board 232 of the elevator landing signalization unit 231. In an embodiment, the connector 140 and the primary antenna 110 may be arranged on or in the same PCB 232 of the elevator landing signalization unit 231, as shown in FIGS. 1 and 2. Alternatively, the elevator landing signalization unit 231 may comprise several PCBs, and the connector 140 and the primary antenna 110 may be arranged on or in separate PCBs of a single elevator landing signalization unit 231. The primary antenna 110 may comprise a metal foil based structure, thereby allowing easy and low cost integration into the PCB 232. Furthermore, such a metal foil based structure requires little space. The metal in the metal foil based structure may comprise e.g. copper or the like.

FIG. 2 illustrates an elevator system 200. It should be noted that at least some of the elements described below may not be mandatory and thus some may be omitted in certain embodiments.

The elevator system 200 comprises an elevator car 210 that has at least one radio frequency transceiver 211. At least one of the radio frequency transceiver(s) 211 in the elevator car 210 may comprise a (wireless) elevator emergency telephone. Furthermore, at least one of the radio frequency transceiver(s) 211 in the elevator car 210 may comprise wireless devices (e.g. mobile telephones, tablet computers, and the like) of the passengers in the elevator car 210.

The elevator system 200 further comprises a hoistway 220 that comprises openings 221a, 221b to floors. Herein, the term "opening" is used to refer to openings to the floors served by the elevator system 200, to allow passenger access to the elevator car 210. Typically, each opening comprises a door frame, door sill, rider plates, door panel(s), door tracks, door hangers and locks.

Each opening 221a, 221b has an associated elevator landing signalization unit 231a, 231b. Herein, the term "signalization" is used to refer to the push buttons, hall lanterns and the like used to call elevator cars and to indicate the status, position and the like of the elevator cars. Accordingly, the elevator landing signalization unit 231a, 231b may comprise elevator call buttons, elevator hall lanterns and/or elevator hall indicators and their associated electronics including printed circuit boards 232a, 232b.

The elevator system 200 further comprises elevator antenna pairs 100a, 100b. In the example of FIG. 2, the functionalities and properties of the primary antennas 110a, 110b, secondary antennas 120a, 120b, wires 130a, 130b, connectors 140a, 140b, and PCBs 232a, 232b are substantially similar to those of their counterparts in the example of FIG. 1, so their descriptions are not repeated here in detail.

The wire 130a, 130b of the antenna pairs 100a, 100b may be laid via a hoistway wall through-hole that has been pre-arranged for display cabling of the associated elevator landing signalization unit 231a, 231b. Accordingly, no extra wall drillings for the antenna pairs 100a, 100b are required.

As shown in FIG. 2, the elevator system 200 may comprise at least two elevator antenna pairs 100a, 100b, the primary antennas 110a, 110b of which may each be arranged in elevator landing signalization units 231a, 231b that are located at different floors. One of the elevator antenna pairs may be arranged in a top floor, one of the elevator antenna pairs may be arranged in a bottom floor, and/or the elevator antenna pairs may be distributed substantially evenly between the floors to provide radio signal coverage for the whole hoistway length. For example, the elevator antenna pairs may be provided at every fifth floor, depending on the radio signal coverage of each elevator antenna pair.

The term 'apparatus' or 'mobile apparatus' is used herein to refer to any device with processing capability such that it can execute instructions. Those skilled in the art will realize that such processing capabilities are incorporated into many different devices and therefore these terms each include mobile telephones (including smart phones), tablet computers, personal digital assistants and many other devices.

One or more interface mechanisms can be used with the exemplary embodiments, including, for example, Internet access, telecommunications in any suitable form (e.g., voice, modem, and the like), wireless communications media, and the like. For example, employed communications networks or links can include one or more satellite communications networks, wireless communications networks, cellular communications networks, 3G communications networks, 4G communications networks, Public Switched Telephone Network (PSTNs), Packet Data Networks (PDNs), the Internet, intranets, a combination thereof, and the like.

Any range or device value given herein may be extended or altered without losing the effect sought.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

Aspects of any of the examples described above may be combined with aspects of any of the other examples described to form further examples without losing the effect sought.

The term 'comprising' is used herein to mean including the elements identified, but that such elements do not comprise an exclusive list and an antenna or apparatus may contain additional elements.

While the present inventions have been de-scribed in connection with a number of exemplary embodiments, and implementations, the present inventions are not so limited, but rather cover various modifications, and equivalent arrangements, which fall within the purview of prospective claims.

The invention claimed is:

1. An elevator system, comprising:
an elevator car associated with at least one radio frequency transceiver, the elevator car configured to open at openings associated with floors as the elevator car moves in a hoistway;
elevator landing signaling devices mounted on first sides of walls of the floors facing the hoistway such that the elevator landing signaling devices are associated with respective ones of the openings, the elevator landing signaling devices connected to an elevator controller via control wiring penetrating through-holes in the walls, the elevator landing signaling devices including printed circuit board (PCBs) having, in addition to circuitry associated with controlling the elevator landing signaling devices, primary antennas and connectors mounted thereto, each of the primary antennas including a passive repeater antenna configured to transmit and receive radio frequency signals with an external wireless communication network external to a building housing the elevator system, the elevator landing signaling devices including at least one of elevator call buttons, elevator hall lanterns or elevator hall indicators such that the PCBs that include the primary antennas are within devices associated with transmitting signals associated with elevator calls; and
secondary antennas within the hoistway on a second side of the walls, the secondary antenna communicatively connected to respective ones of the primary antennas via wires penetrating same ones of the through-hole in the walls as the control wiring to connect the wires to the connector of respective ones of the PCBs to form antenna pairs such that the antenna pairs are distributed substantially evenly between the floors to provide radio signal coverage for a whole length of the hoistway, the secondary antennas each including a passive repeater antenna configured to transmit and receive radio frequency signals with the at least one radio frequency transceiver within the elevator car, wherein
one or more of a mobile device associated with a passenger traveling within the elevator car or elevator emergency communication equipment within the elevator car is configured to exchange communications between the elevator car and the external wireless communication network via a communication path including the at least one RF transceiver associated with the elevator car, at least one of the secondary antennas within the hoistway, and the respective ones of the primary antennas within the elevator landing signaling devices wiredly connected to the at least one of the secondary antennas via the wires penetrating the through-hole and wirelessly communicating with the external wireless communication network.

2. The elevator system according to claim 1, wherein one of the antenna pairs is arranged in a top floor.

3. The elevator system according to claim 1, wherein one of the antenna pairs is arranged in a bottom floor.

4. The elevator system according to claim 1, wherein the primary antennas comprise a metal foil.

5. The elevator system according to claim 1, wherein the external wireless communication network is a wireless telecommunication network.

6. The elevator system according to claim 1, further comprising:
The elevator emergency communication equipment including the at least one radio frequency transceiver within the elevator car such that the elevator emergency communication equipment is configured to communicate with the external wireless communication network via the second antennas.

7. An elevator system comprising:
a plurality of elevator landing signaling devices mounted on first sides of walls of landings of a hoistway with control wirings connecting the plurality of elevator landing signaling devices to an elevator controller penetrating through-holes in the walls, the elevator landing signaling devices including printed circuit board (PCBs) having, in addition to circuitry associated with controlling the elevator landing signaling devices, primary antennas and connectors mounted thereto, the primary antennas configured to transmit and receive radio frequency signals with an external wireless communication network external to a building housing the elevator system, the plurality of elevator landing signaling devices each including at least one of elevator call buttons, elevator hall lanterns or elevator hall indicators such that the PCBs that include the primary antennas are within devices associated with transmitting signals associated with elevator calls; and secondary antennas within the hoistway on a second side of the walls, the secondary antennas communicatively connected to respective ones of the primary antennas via wires penetrating same ones of the through-holes in the walls as the control wiring to connect the wires to the connector of respective ones of the PCBs to form antenna pairs that relay communication from at least one radio frequency transceiver within an elevator car in the hoistway to the external wireless communication network via the respective ones of the primary antennas connected thereto, wherein one or more of a mobile device associated with a passenger traveling within the elevator car or elevator emergency communication equipment within the elevator car is configured to exchange communications between the elevator car and the external wireless communication network via a communication path including the at least one RF transceiver associated with the elevator car, at least one of the secondary antennas within the hoistway, and the respective ones of the primary antennas within the elevator landing signaling devices wiredly connected to the at least one of the secondary antennas via the wires penetrating the through-hole and wirelessly communicating with the external wireless communication network.

8. The elevator system of claim 7, wherein the primary antennas and the secondary antennas are arranged as antenna pairs such that the antenna pairs are distributed substantially evenly between floors of a building to provide radio signal coverage for a whole length of the hoistway.

9. The elevator system of claim 7, wherein the primary antennas and the secondary antennas each include passive repeaters.

10. The elevator system of claim 7, wherein the primary antennas and the secondary antennas are arranged as antenna pairs associated with landings of a building such that, in each of the antenna pairs, the primary antennas are outside the hoistway on a respective one of the landings and the secondary antennas are inside the hoistway adjacent to the respective one of the landings.

11. The elevator system of claim 7, further comprising:
the elevator emergency communication equipment including the at least one radio frequency transceiver within with the elevator car such that the elevator emergency communication equipment is configured to communicate with the external wireless communication network via the second antennas.

* * * * *